United States Patent [19]
Ferri

[11] Patent Number: 5,385,392
[45] Date of Patent: Jan. 31, 1995

[54] RECOVERABLE AND A DIRECT RELEASE AND NON-RECOVERABLE BAIL-OFF LOGIC ARRANGEMENT FOR USE ON A RAILROAD VEHICLE

[75] Inventor: Vincent Ferri, Pittsburgh, Pa.

[73] Assignee: Westinghouse Air Brake Company, Wilmerding, Pa.

[21] Appl. No.: 929,037

[22] Filed: Aug. 13, 1992

[51] Int. Cl.$^6$ .............................................. B60T 13/68
[52] U.S. Cl. ......................................... 303/20; 303/3; 303/15
[58] Field of Search ...................... 303/3, 15, 20, 7, 16, 303/17, 18; 246/182 A, 182 B, 188, 189, 190

[56] References Cited
U.S. PATENT DOCUMENTS

| | | | |
|---|---|---|---|
| 5,172,316 | 12/1992 | Root et al. | 303/20 |
| 5,192,118 | 3/1993 | Balukin et al. | 303/16 |
| 5,222,788 | 6/1993 | Dimsa et al. | 303/20 |

*Primary Examiner*—Matthew C. Graham
*Attorney, Agent, or Firm*—John B. Sotak

[57] ABSTRACT

A recoverable bail-off circuit and a direct release and non-recoverable bail-off circuit for enhancing the bail-off function of the air brake pressure on a railway locomotive including a first logic circuit for ascertaining when a non-recoverable bail-off command is present by determining the presence of a manual bail-off signal or the presence of a dynamic bail-off signal and by determining the absence of an emergency brake signal, an electronic and logic circuit for ascertaining when a direct release command is present by determining a freight/passenger mode signal and that a present brake pipe pressure signal is greater than a previous brake pipe pressure signal by a certain pressure and a second logic circuit for ascertaining when a recoverable bail-off command is present by determining the presence of the manual bail-off signal or the presence of a dynamic bail-off signal and determining the presence of the emergency brake signal.

17 Claims, 1 Drawing Sheet

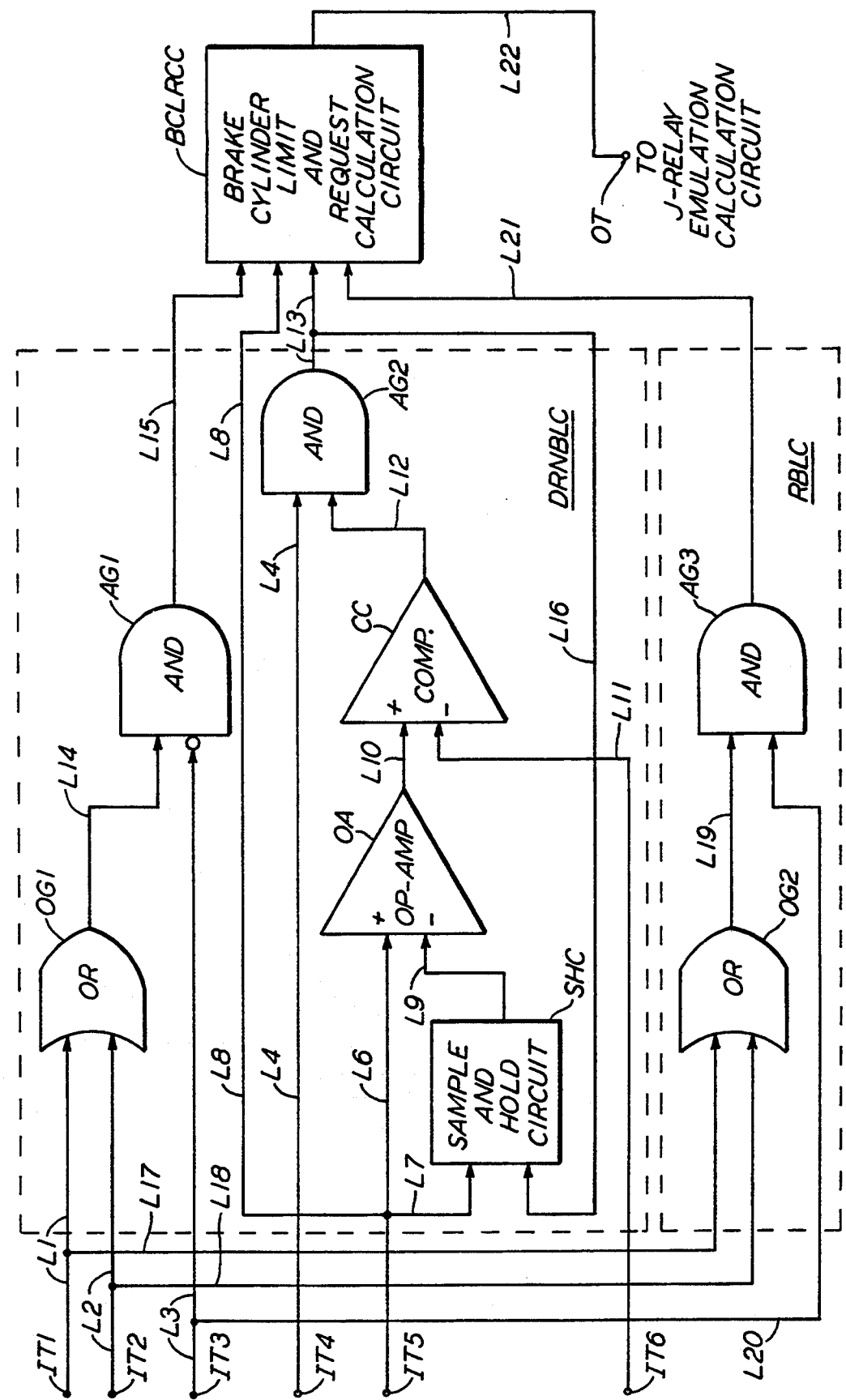

RECOVERABLE AND A DIRECT RELEASE AND NON-RECOVERABLE BAIL-OFF LOGIC ARRANGEMENT FOR USE ON A RAILROAD VEHICLE

FIELD OF THE INVENTION

This invention relates to a logic arrangement for an enhanced bail-off system for railway vehicles and more particularly to a direct release and non-recoverable bail-off logic circuit and a recoverable bail-off bail-off logic circuit for enhancing a pneumatic bail-off operation of the brake cylinder pressure on railroad locomotives.

BACKGROUND OF THE INVENTION

Normally, a railroad engineer or trainman has the option of commonly controlling the brakes of the entire train by only moving the automatic brake handle or of separately controlling the brakes of the locomotive consist from the remainder of the train by operating the independent brake handle. For instance, during an automatic braking operation, the engineer in the lead locomotive appropriately moves the automatic brake handle into a desired position in the brake range so as to cause a reduction in the brake pipe pressure. When the brake pipe pressure is reduced, the brakes on all of the railway cars as well as the brakes on the locomotive consist are applied by introducing a predetermined ratio of air pressure to the brake cylinders. When the pressure reaches the requested brake command level, the brake equipment will go into a lap condition to maintain the braking effort constant. Now if a further increase of braking effort on the entire train is desired, the operating engineer again causes a reduction of air pressure in the brake pipe by movement of the automatic brake handle which, in turn, results in an increase of air pressure in the brake cylinders. Now when the brake cylinder pressure corresponds to the requested brake command, the brake equipment will again go into a lap condition to maintain a constant braking effort. Under certain operating conditions, it may be advantageous to independently control the pneumatic pressure in the brake cylinders on the locomotive consist from the pneumatic pressure in the brake cylinders on the trailing railway cars of the train. In such a situation, the brakes on the locomotives may be separately controlled by manipulating the independent brake handle. Thus, the brake pressure in the brake cylinders of the locomotive consist may be independently increased or decreased to selectively control the braking effort. That is, if the engineer requires different braking characteristics on the locomotive, it was possible to bail-off the brakes on the locomotive by depressing the independent brake handle. In the past, if the engineer bails off and reduces the brake cylinder pressure on the locomotive to zero pounds per square inch (0 psi), and then initiates a further reduction of brake pipe pressure, the new level of brake pipe pressure only returns to a value consistent with the most recent brake pipe reduction. Thus, each depression and release of the bail-off handle can eventually result in a zero pressure to exist in the brake cylinders on the locomotive consist of the train. It will be appreciated that such a condition is not only undesirable, but is also unsafe since the locomotive brakes are inoperable.

OBJECTS AND SUMMARY OF THE INVENTION

Accordingly, it is an object of this invention to a new and improved direct release and non-recoverable bail-off logic and recoverable bail-off logic arrangement for use in pneumatic braking systems on railway vehicles.

Another object of this invention is to provide a unique recoverable bail-off logic and direct release and non-recoverable logic system for use in a bail-off enhancement arrangement for railroad locomotives.

A further object of this invention is to provide a novel direct release and non-recoverable bail-off logic circuit and recoverable bail-off logic circuit for use in an air brake system on railway locomotives.

Yet another object of this invention is to provide a direct release and non-recoverable bail-off logic and recoverable bail-off logic arrangement for use on a railway vehicle comprising, a first pair of logic gate circuits for determining a non-recoverable bail-off command by sensing the presence of a manual bail-off signal, by sensing the presence of a dynamic bail-off signal, and by sensing the absence of an emergency brake signal, a plurality of electronic circuits and a logic gate circuit for determining a direct release command by sensing a freight/passenger mode signal and sensing that a present brake pipe pressure signal is greater than a previous brake pipe pressure signal by a given amount, and a second pair of logic gate circuits for determining a recoverable bail-off command by sensing the presence of said manual bail-off signal and sensing the presence of said dynamic bail-off signal as well as sensing the presence of said emergency brake signal.

Still another object of the invention is to provide a recoverable bail-off logic circuit and a direct release and non-recoverable bail-off logic circuit for enhancing the bail-off function of the air brake pressure on a railway locomotive comprising, first logic means for ascertaining when a non-recoverable bail-off command is present by determining the presence of a manual bail-off signal, by determining the presence of a dynamic bail-off signal, and by determining the absence of an emergency brake signal, electronic and logic means for ascertaining when a direct release command is present by determining a freight/passenger mode signal and for ascertaining that a present brake pipe pressure signal is greater than a previous brake pipe pressure signal by a certain pressure, and a second logic means for ascertaining when a recoverable bail-off command is present by determining the presence of said manual bail-off signal and the presence of a dynamic bail-off signal and by determining the presence of said emergency brake signal.

Yet a further object of this invention is to provide a new direct release and non-recoverable bail-off logic and recoverable bail-off logic circuit which is simple in design, economical in cost, durable in use, efficient in service, and reliable in operation.

DESCRIPTION OF THE DRAWINGS

The above objects and other attendant features and advantages will be more readily appreciated as the present invention becomes better understood by reference to the following detailed description when considered in conjunction with the accompanying drawing, wherein:

The single FIGURE is a schematic circuit block diagram of a direct release and non-recoverable bail-off logic circuit and a recoverable bail-off logic circuit for use in a bail-off enhancement arrangement for railroad locomotives in accordance with the present invention.

DETAILED DESCRIPTION OF THE INVENTION

Referring now to the single FIGURE of the drawing, there is shown a direct release and non-recoverable bail-off logic and recoverable bail-off logic arrangement for the air brake cylinders on a railroad locomotive consist. As shown and described in U.S. patent application Ser. No. 07/929,048 filed concurrently herewith, entitled "Arrangement For Enhancing the Bail-Off Function of Brake Cylinder Pressures On A Railroad Locomotive" which is assigned to the assignee of this invention and which is incorporated by reference to the present application. Briefly, the electronically controlled pneumatic brake system included a pneumatic operated control portion and an electronic portion. The electronic portion includes a direct release and non-recoverable bail-off logic circuit, a recoverable bail-off logic circuit, a brake cylinder limit and request calculation circuit, a J-relay emulation calculation circuit and a brake cylinder feedback control circuit which is electrically interfaced or interconnected with the pneumatic operating portion.

As shown, the direct release and non-recoverable bail-off logic circuit DRNBLC includes a plurality of gates which are suitable interconnected to appropriate electronic circuits which supply input signals to the brake cylinder limit and request calculation circuit BCLRCC while the recoverable bail-off logic circuit RBLC includes a pair of gates which supply an input signal to the brake cylinder limit and request calculation circuit BCLRCC. It will be seen that one input of a first two input OR gate circuit OG1 is connected to terminal IT1, via lead 61 while the other input is connected to terminal IT2 via lead L2. The logic signal developed on input terminal IT1 is indicative of whether or not a manual bail-off flag is present. For example, the presence of a manual bail-off flag may be represented by a high or logical "1" signal while the absence of a manual bail-off flag may be represented by a low or a logical "0" signal. The logic signals may be controlled by a suitable ON-OFF switch or the like which is conditioned by the independent brake handle being in or out of a bail-off position. It will be appreciated that logic signal developed on input terminal IT2 is indicative of whether or not a dynamic bail-off flag is present. For example, the presence of a dynamic bail-off flag may be represented by a high or a logical "1" signal while the absence of a dynamic bail-off flag may be represented by a low or a logical "0" signal. The logical signals are developed by a suitable dynamic brake monitoring circuit which is provided and supplied by the locomotive builder.

It will be seen that the output of the first OR gate OG1 is connected to one input of a first two-input AND gate circuit AG1 via lead L14 while the other input of the first two-input AND gate circuit AG1 is connected to terminal IT3 via lead L3. The logic signal appearing on input terminal IT3 is dependent upon the condition of the emergency brake status. If the emergency brake application is in effect, a high or a logical "1" is developed on input terminal IT3, and conversely, if the emergency brake is not in effect, a low or logical "0" is developed on input terminal IT3. As shown, the logic signal appearing on terminal IT3 is inverted as signified by the inversion input circle. It will be noted that the output of the AND gate AG1 is connected to a first input terminal of a brake limit and request calculation circuit BCLRCC via lead L15.

It will be understood that the logic signal appearing on input terminal IT4 is either freight mode flag signal or a passenger mode flag signal. In practice, the freight mode flag may be represented by a high or a logical "1" signal while the passenger mode flag may be represented by a low or a logical "0" signal. The particular operating mode is preselected by actuating a switch prior to placing the locomotive in revenue service. It will be noted that the input terminal IT4 is connected to one input of a second two-input AND gate circuit AG2 via lead L4.

As shown, an input terminal IT5 is connected by leads L5 and L6 to the positive (+) input of a unity gain operational amplifier OA. The electrical control signal appearing on terminal IT5 is indicative of the brake pipe pressure level. It will be noted that the control signal appearing on input terminal IT5 is also connected to an input of a sample and hold circuit SHC via leads L5 and L7 and in addition is connected by leads L5 and L8 to a second input of a brake cylinder limit and request calculation circuit BCLRCC as will be described hereinafter.

It will be observed that the output of the sample and hold circuit SHC is connected by lead L9 to the negative (−) input of the operational amplifier circuit OA. The output of the operational amplifier OA is connected by lead L10 to the positive (+) input of a comparator circuit CC. It will be seen that the negative (−) input of the comparator CC is connected by lead L11 to terminal IT6 which is supplied with a reference voltage signal that is equivalent to an air pressure value of two pounds per square inches (2 psi). It will be noted that the output of the comparator circuit CC is connected to the other input of the two-input AND gate AG2 via lead L12. As shown, the output of the AND gate circuit AG2 is connected to a third input of the brake limit and request calculation circuit via lead L13. It will be observed that the output developed on lead L13 is fed back to the input of the sample and hold circuit via lead L16.

As previously mentioned, the recoverable bail-off logic circuit RBLC includes a pair of logic gate circuits, such as, a second two-input OR gate OG2 and a third two-input AND gate AG3. It will be seen that the manual bail-off terminal IT1 is connected to one input of the two-input OR gate circuit OG2 via leads L1 and L17 while the other input of OR gate OG2 is connected to the dynamic bail-off terminal via leads L2 and L18. As shown, the output of the second OR gate circuit OG2 is connected to one input of the third AND gate circuit AG3 via lead L19 while the other input of the third AND gate AG3 is connected to the emergency brake terminal IT3 via lead L3 and L20. It will be noted that the output of the third AND gate circuit AG3 is connected to the fourth input of the brake cylinder limit and request calculation circuit BCLRCC via lead L21. The output of the brake cylinder limit and request calculation circuit BCLRCC is connected by lead L22 to output terminal OT which is connected to a J-relay emulation calculation circuit which is shown and disclosed in the above-noted U.S. patent application Ser. No. 07/929,048 now U.S. Pat. No. 5,286,096.

Turning now to the operation of the system of the present invention, it will be appreciated that if a manual bail-off flag is pending, namely, a logical "1" signal is present on terminal IT1 and/or a dynamic bail-off flag is pending, namely, a logical "1" signal is present on terminal IT2, then a logical "1" signal is produced by OR gate OG1. The logical "1" signal is conveyed to the one input of the AND gate AG1 and if no emergency brake flag signal is present, a logical "0" will appear on terminal IT3. However, the logical "0" is inverted so that a logical "1" is applied to the other input of the AND gate AG1. The appearance of a logical "1" on lead 15 signifies a non-recoverable bail-off condition in which the pressure in the brake cylinders can be reduced to a zero level but is incapable of recovering its original pressure value and the bail-off command is removed.

Let us now assume that no bail-off condition is eminent and that a direct release command is pending. In order to produce a direct release, the locomotive must be in a freight operating mode so that the one input of the second AND gate AG2 is at a high or logical "1". Now if the present brake pipe pressure exceeds the previous brake pipe pressure by 2 psi, the other input of the AND gate AG2 is at a high or logical "1" via sample and hold circuit SH1 operational amplifier OA, and comparator circuit CC and lead L12. Thus, a high or logical "1" appears on lead L13 which signifies a direct release command is pending. This signal commands a total release of the brake cylinder pressure. As previously noted, a brake pipe indication signal is conveyed to the input of the brake cylinder limit and request calculation circuit BCLRCC.

Now let us assume that either or both a manual bail-off flag and/or a dynamic bail-off flag is present on the respective input terminal IT1 and IT2. Thus, the second OG2 conveys a high or logical "1" to the one input of the third AND gate AG3. Further, let us assume that an emergency brake flag or condition is present so that input terminal is at a high or logical "1". The logical "1" on terminal IT3 is inverted and appears as a logical "0" on the other input of the first AND gate AG1 so that this gate is disabled. However, the logical "1" on terminal IT3 is conveyed to the other input of AND gate AG3 via lead L20. Accordingly, AND gate AG3 is activated and supplies a logical "1" to the brake cylinder limit and request calculation circuit BCLRCC which signifies a recoverable bail-off command. The recoverable bail-off command allows the pressure within the brake cylinders to be reduced to a zero level with the ability to recover the pressure to its original value once the bail-off command is removed.

In summary, it may be stated,
(a) that a non-recoverable bail-off condition will exist if:
1. The manual bail-off flag is active

OR

2. The dynamic bail-off flag is active

AND

3. The emergency brake flag is inactive,
(b) that a direct release signal is present if:
1. Freight mode is selected

AND

2. The brake pipe indication is greater than the previous brake pipe value by 2 psi, and
(c) that recoverable bail-off condition will exist if:
1. The manual bail-off flag is active

OR

2. The dynamic bail-off flag is active,

AND

3. The emergency brake flag is active.

Thus, the present invention has been described in such full, clear, concise, and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate outputs. Therefore, it will be appreciated that certain modifications, ramifications, and equivalents will be readily apparent to persons skilled in the art, and accordingly it is understood that the present invention should not be limited to the exact embodiment shown and described, but should be accorded the full scope and protection of the appended claims.

What I claim is:

1. A direct release and non-recoverable bail-off logic and recoverable bail-off logic arrangement for use on a railway vehicle comprising, a first pair of logic gate circuits for determining a non-recoverable bail-off command by sensing the presence of a manual bail-off signal, by sensing the presence of a dynamic bail-off signal, and by sensing the absence of an emergency brake signal, said first pair of logic gate circuits includes an OR gate, a plurality of electronic circuits and a logic gate circuit for determining a direct release command by sensing a freight/passenger mode signal and sensing that a present brake pipe pressure signal is greater than a previous brake pipe pressure signal by a given amount, and a second pair of logic gate circuits for determining a recoverable bail-off command by sensing the presence of said manual bail-off signal and sensing the presence of said dynamic bail-off signal as well as sensing the presence of said emergency brake signal.

2. The direct release and non-recoverable bail-off logic and recoverable bail-off logic arrangement for use on a railway vehicle as defined in claim 1, wherein said OR gate includes two inputs.

3. The direct release and non-recoverable bail-off logic and recoverable bail-off logic arrangement for use on a railway vehicle as defined in claim 1, wherein said first pair of logic gate circuits includes an AND gate.

4. The direct release and non-recoverable bail-off logic and recoverable bail-off logic arrangement for use on a railway vehicle as defined in claim 3, wherein said AND gate includes two input.

5. The direct release and non-recoverable bail-off logic and recoverable bail-off logic arrangement for use on a railway vehicle as defined in claim 4, wherein the output of said OR gate is connected to one of said two inputs of said AND gate.

6. The direct release and non-recoverable bail-off logic and recoverable bail-off logic arrangement for use on a railway vehicle as defined in claim 5, wherein the absence of said emergency brake signal is inverted and is connected to another of said two inputs of said AND gate.

7. The direct release and non-recoverable bail-off logic and recoverable bail-off logic arrangement for use on a railway vehicle as defined in claim 1, wherein said plurality of electronic circuits includes a sample and hold circuit.

8. The direct release and non-recoverable bail-off logic and recoverable bail-off logic arrangement for use on a railway vehicle as defined in claim 7, wherein said plurality of electronic circuits includes an operational amplifier having one input receiving said present brake pipe pressure signal and having another input receiving said previous brake pipe pressure signal.

9. The direct release and non-recoverable bail-off logic and recoverable bail-off logic arrangement for use on a railway vehicle as defined in claim 8, wherein said plurality of electronic circuits includes a comparator having one input connected to the output of said operational amplifier and having another input connected to a reference pressure signal.

10. A direct release and nonrecoverable bail-off logic and recoverable bail-off logic arrangement for use on a railway vehicle comprising, a first pair of logic gate circuits for determining a non-recoverable bail-off command by sensing the presence of a manual bail-off signal, by sensing the presence of a dynamic bail-off signal, and by sensing the absence of an emergency brake signal, said logic gate circuit is an AND gate, a plurality of electronic circuits and a logic gate circuit for determining a direct release command by sensing a freight/passenger mode signal and sensing that a present brake pipe pressure signal is greater than a previous brake pipe pressure signal by a given amount, and a second pair of logic gate circuits for determining a recoverable bail-off command by sensing the presence of said manual bail-off signal and sensing the presence of said dynamic bail-off signal as well as sensing the presence of said emergency brake signal.

11. The direct release and non-recoverable bail-off logic and recoverable bail-off logic arrangement for use on a railway vehicle as defined in claim 10, wherein said AND gate includes two inputs.

12. The direct release and non-recoverable bail-off logic and recoverable bail-off logic arrangement for use on a railway vehicle as defined in claim 11, wherein said freight/passenger mode signal is connected to one of said two input of said AND gate.

13. The direct release and non-recoverable bail-off logic and recoverable bail-off logic arrangement for use on a railway vehicle as defined in claim 12, wherein the output of said comparator is connected to another of said two inputs of said AND gate.

14. A direct release and non-recoverable bail-off logic and recoverable bail-off logic arrangement for use on a railway vehicle comprising, a first pair of logic gate circuits for determining a non-recoverable bail-off command by sensing the presence of a manual bail-off signal, by sensing the presence of a dynamic bail-off signal, and by sensing the absence of an emergency brake signal, said second pair of logic gate circuits includes an OR gate, a plurality of electronic circuits and a logic gate circuit for determining a direct release command by sensing a freight/passenger mode signal and sensing that a present brake pipe pressure signal is greater than a previous brake pipe pressure signal by a given amount, and a second pair of logic gate circuits for determining a recoverable bail-off command by sensing the presence of said manual bail-off signal and sensing the presence of said dynamic bail-off signal as well as sensing the presence of said emergency brake signal.

15. The direct release and non-recoverable bail-off logic and recoverable bail-off logic arrangement for use on a railway vehicle as defined in claim 14, wherein said second pair of logic gate circuits includes an AND gate.

16. The direct release and non-recoverable bail-off logic and recoverable bail-off logic arrangement for use on a railway vehicle as defined in claim 15, wherein said AND gate includes two inputs.

17. The direct release and non-recoverable bail-off logic and recoverable bail-off logic arrangement for use on a railway vehicle as defined in claim 16, wherein said output of said OR gate is connected to one of said two inputs of said AND gate.

* * * * *